(12) United States Patent
Lin et al.

(10) Patent No.: US 12,263,429 B2
(45) Date of Patent: Apr. 1, 2025

(54) FILTER MESH FRAME, FILTER MESH STRUCTURE, AND USAGE THEREOF

(71) Applicant: GREENFILTEC LTD., Taoyuan (TW)

(72) Inventors: Po-Hung Lin, Taoyuan (TW); Yu-de Lien, Taoyuan (TW)

(73) Assignee: GREENFILTEC LTD., Taoyuan (TW)

( * ) Notice: Subject to any disclaimer, the term of this patent is extended or adjusted under 35 U.S.C. 154(b) by 638 days.

(21) Appl. No.: 17/556,311

(22) Filed: Dec. 20, 2021

(65) Prior Publication Data
US 2022/0193591 A1  Jun. 23, 2022

(30) Foreign Application Priority Data
Dec. 21, 2020  (TW) .................. 109145334

(51) Int. Cl.
*B01D 46/00*  (2022.01)
*B01D 46/02*  (2006.01)
*B01D 46/30*  (2006.01)

(52) U.S. Cl.
CPC ......... *B01D 46/0005* (2013.01); *B01D 46/02* (2013.01); *B01D 46/30* (2013.01); *B01D 2265/06* (2013.01)

(58) Field of Classification Search
CPC  B01D 46/30; B01D 53/0431; B01D 46/0036; B01D 2265/06; B01D 24/08; B01D 46/02; B01D 46/0005
See application file for complete search history.

(56) References Cited

FOREIGN PATENT DOCUMENTS

| JP | 2001-132562 A | 5/2001 |
|----|----|----|
| JP | 2002-1040 A | 1/2002 |
| JP | 2004-148165 A | 5/2004 |

*Primary Examiner* — Robert Clemente
(74) *Attorney, Agent, or Firm* — Birch, Stewart, Kolasch & Birch, LLP

(57) ABSTRACT

A filter mesh frame is provided. The filter mesh frame includes a first mesh and a second mesh. The first mesh surrounds to form a cylinder with respect to a first pivot direction. The second mesh surrounds the first mesh with respect to a first pivot direction and includes a plurality of bar structures, where the bar structures protrude outward with respect to the first mesh and are disposed parallel to the first pivot direction. A groove parallel to the first pivot direction is formed on one side of each bar structure with respect to the first mesh.

17 Claims, 11 Drawing Sheets

FILTER MESH FRAME, FILTER MESH STRUCTURE, AND USAGE THEREOF

TECHNICAL FIELD

The present invention relates to a filter mesh frame, a filter mesh structure, and usage thereof.

BACKGROUND

In the industrial manufacturing field such as semiconductor manufacturing, to further improve the product yield, a clean room is widely applied to a clean and pollution-free isolated environment for manufacturing products.

To meet the environment requirements of the clean room, a fan and a filtering device are generally installed at an air inlet of the clean room, so that an air flow is driven by the fan, passes through a filter mesh of the filtering device, and then enters the clean room to filter dust and various organic and inorganic pollutants.

In the pollutants, gaseous molecular pollutants do not have a fixed shape as dust and cannot be filtered out by controlling a pore size of the filter. Therefore, active carbon materials are commonly used to remove the gaseous molecular pollutants. The inner and outer cylindrical meshes made of polymer such as acrylonitrile butadiene styrene (ABS) or metal such as stainless steel are disposed on the conventional filter mesh structure, and are filled with active carbon filter materials. However, in actual use, it can be found that there are extremely large differences in surface wind speed at each point of the conventional filter mesh structure, resulting in extremely uneven pressure loss, the filter material such as the active carbon in the structure cannot be consumed uniformly, and the usage efficiency needs to be improved.

SUMMARY

An objective of the present invention is to provide a filter mesh frame, which can increase a surface area, reduce pressure loss, improve usage efficiency of a filter material, and improve an adsorption effect of the filter material.

Another objective of the present invention is to provide a filter mesh structure with a larger surface area, lower pressure loss, better usage efficiency of a filter material, and better adsorption effect of the filter material.

Another objective of the present invention is to provide a method for using a filter mesh structure, which can reduce pressure loss, improve usage efficiency of a filter material, and improve an adsorption effect of the filter material.

A filter mesh frame of the present invention includes a first mesh and a second mesh. The first mesh surrounds to form a cylinder with respect to a first pivot direction. The second mesh surrounds the first mesh with respect to a first pivot direction and includes a plurality of bar structures, where the bar structures protrude outward with respect to the first mesh and are disposed parallel to the first pivot direction, a groove parallel to the first pivot direction is formed on one side of each bar structure with respect to the first mesh, the bar structure has a U shaped-like cross section on a virtual cross section perpendicular to the first pivot direction, and a width of an opening portion of the U shaped-like cross section facing the first mesh is greater than a width of a bottom portion of the U shaped-like cross section.

In the embodiments of the present invention, the plurality of bar structures are connected to each other by long sides thereof.

In the embodiments of the present invention, the first mesh surrounds to form the cylinder with respect to the first pivot direction. The second mesh surrounds the first mesh with respect to a first pivot direction and includes a plurality of bar structures disposed parallel to the first pivot direction, where each bar structure has a first frame piece, a second frame piece, and a third frame piece that are sequentially connected by long sides and jointly form a groove, the groove of each bar structure faces the first mesh, the bar structure has a U shaped-like cross section on a virtual cross section perpendicular to the first pivot direction, and a width of an opening portion of the U shaped-like cross section facing the first mesh is greater than a width of a bottom portion of the U shaped-like cross section.

In the embodiments of the present invention, the third frame piece of one of the plurality of bar structures is connected to the first frame piece of another one of the plurality of bar structures, so that the plurality of bar structures surround the first mesh with respect to the first pivot direction.

In the embodiments of the present invention, an angle between 45° and 60° is included between extension lines of two side edges of the U shaped-like cross section.

In the embodiments of the present invention, an angle between 50° and 55° is included between extension lines of two side edges of the U shaped-like cross section.

In the embodiments of the present invention, the number of bar structures is 8.

In the embodiments of the present invention, a ratio of a maximum width of the second mesh on the virtual cross section perpendicular to the first pivot direction to the width of the bottom portion of the U shaped-like cross section is between 5 and 15.

In the embodiments of the present invention, a ratio of a maximum width of the second mesh on the virtual cross section perpendicular to the first pivot direction to the width of the bottom portion of the U shaped-like cross section is between 9 and 10.

In the embodiments of the present invention, a first opening and a second opening are respectively formed on two ends of the first mesh which surrounds to form the cylinder, and the filter mesh frame further includes a fixing device and a closing device. The fixing device has a port disposed on an outer side of the first opening and respectively connected to one end of the first mesh and one end of the second mesh, for the first opening to communicate with the port. The closing device is disposed on an outer side of the second opening and respectively connected to an other end of the first mesh and an other end of the second mesh, for the second opening to be closed by the closing device.

The filter mesh structure of the present invention includes the filter mesh frame and a filter material disposed between the first mesh and the second mesh.

In the method for using the filter mesh structure of the present invention, a suction force is applied on an outer side of the filter mesh structure to suck filtered air into the filter mesh structure from the first opening, and the filtered air sequentially passes through the first mesh, the filter material, and the second mesh, and then leaves the filter mesh structure.

DETAILED DESCRIPTION

Figure 1A:
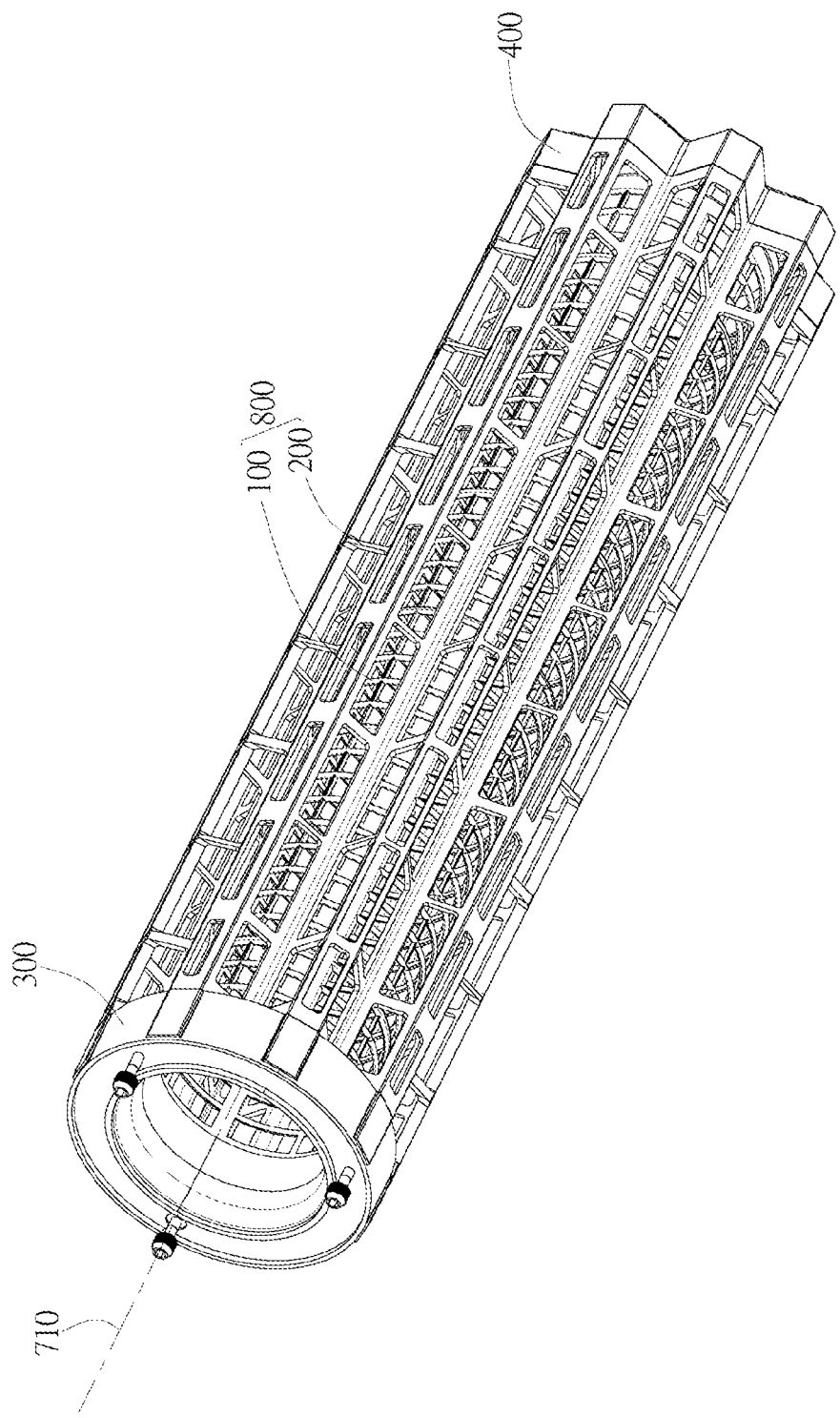
FIG. 1A and FIG. 1B are a schematic diagram of an embodiment of a filter mesh frame according to the present invention.
Figure 1B:
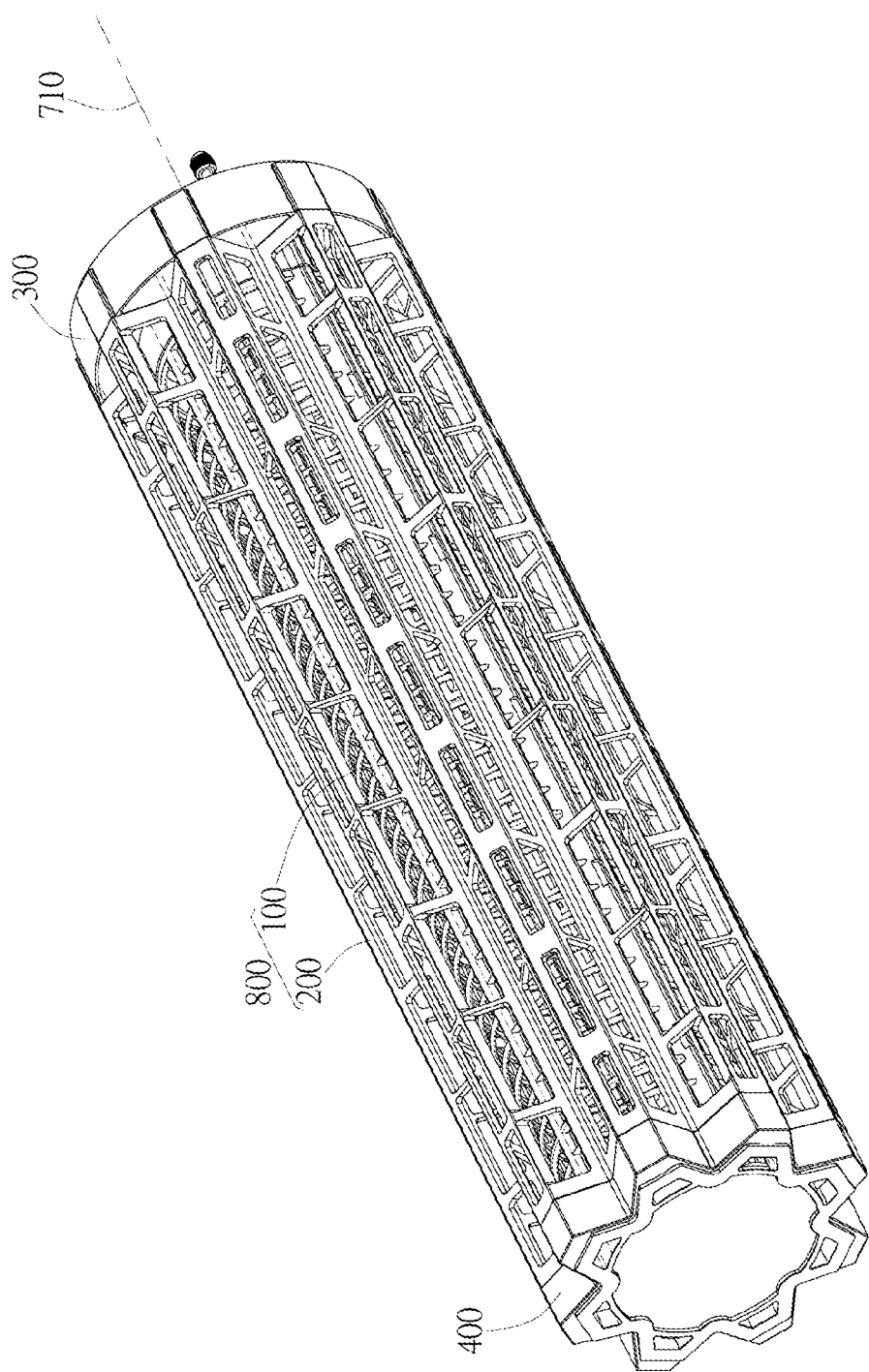

In an embodiment shown in FIG. 1A and FIG. 1B, a filter mesh frame 800 of the present invention includes a first mesh 100 and a second mesh 200. The filter mesh frame 800 can be used to carry a filter material to form a filter mesh structure. More specifically, there is an accommodating space between the first mesh 100 and the second mesh 200 for filling the filter material. The first mesh 100 and the second mesh 200 are mainly used as frames to provide mechanical strength required to carry the filter material. The filter mesh structure is further described below.

Figure 2A:
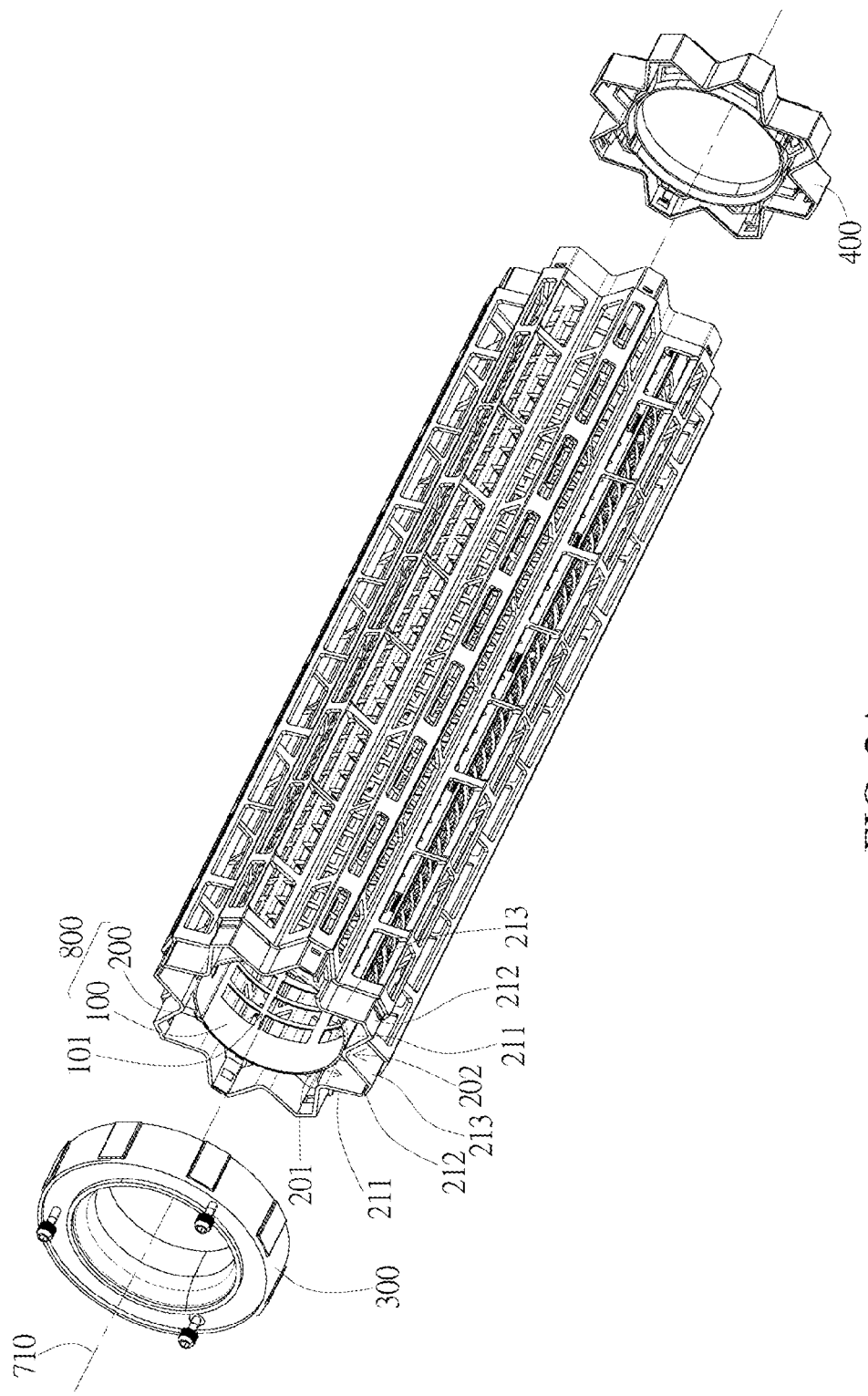
FIG. 2A to FIG. 2C are a schematic exploded view of an embodiment of a filter mesh frame according to the present invention.
Figure 2B:
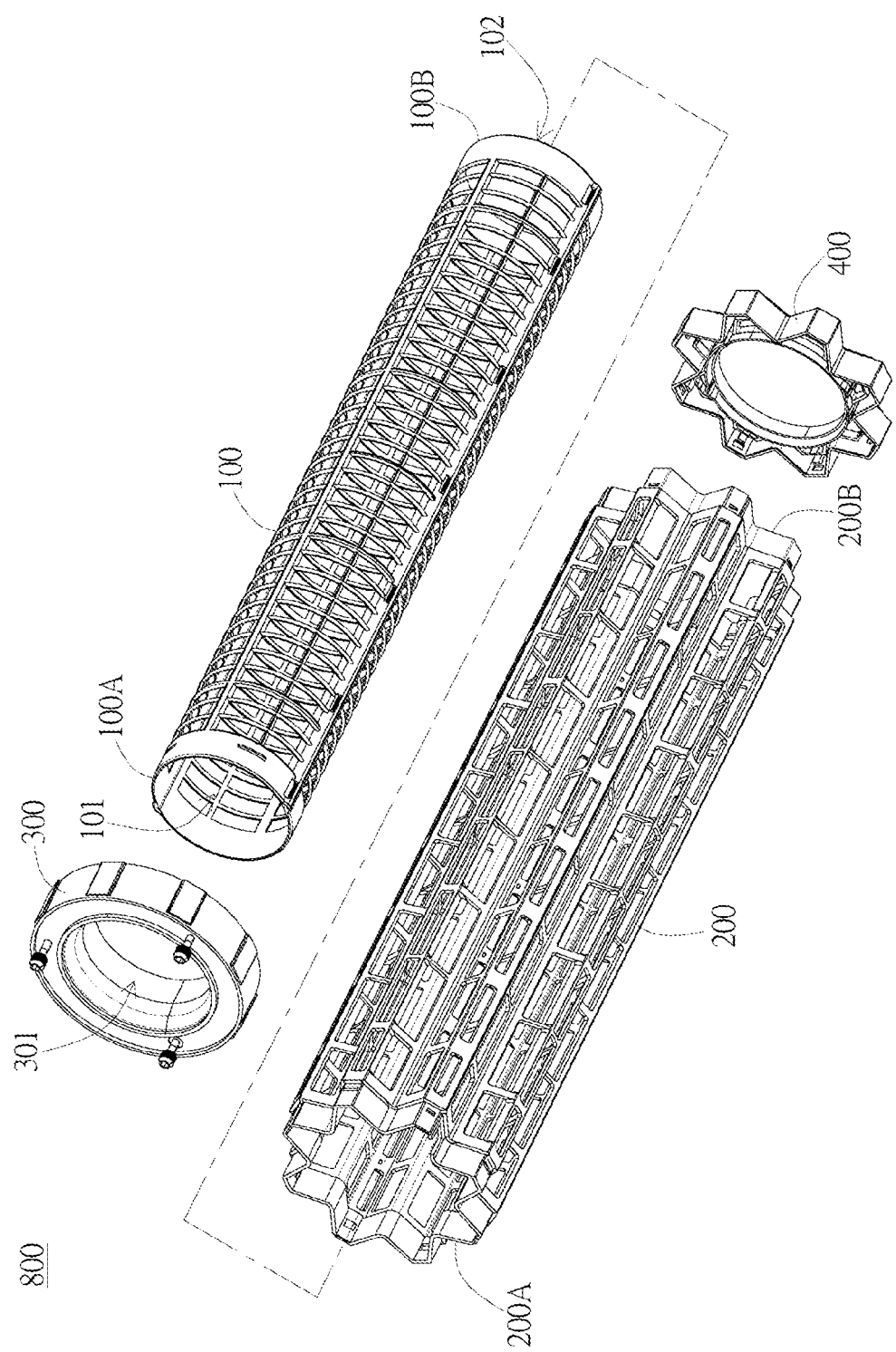
Figure 2C:
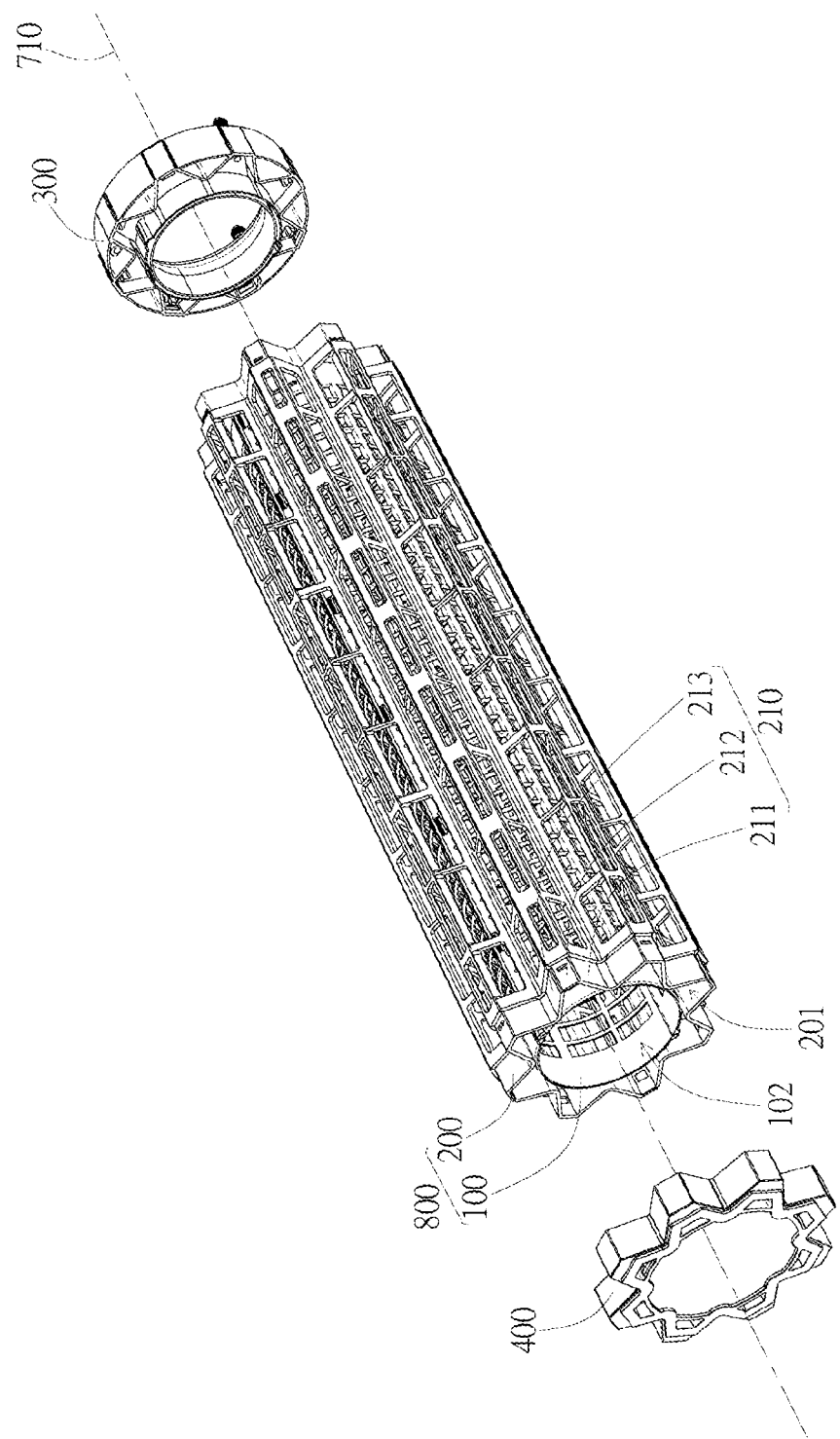

In an embodiment shown in FIG. 2A to FIG. 2C, the first mesh 100 surrounds to form a cylinder with respect to a first pivot direction 710. Further, the first mesh 100 is a cylinder and has a circular cross section on a virtual cross section perpendicular to the first pivot direction, and the cylinder extends along the first pivot direction 710. According to requirements of design, manufacturing, or use, the first mesh 100 may be formed by one part or spliced by a plurality of parts, and may be made of metal, alloy, polymer, or other materials that can provide mechanical strength required to carry the filter material.

The second mesh 200 surrounds the first mesh 100 with respect to the first pivot direction 710 and includes a plurality of bar structures 210, where the bar structures 210 protrude outward with respect to the first mesh 100 and are disposed parallel to the first pivot direction 710. In other words, a recess 202 is sandwiched between two adjacent bar structures 210. Further, the second mesh 200 is a polygonal cylinder and has a polygonal cross section on the virtual cross section perpendicular to the first pivot direction, and the cylinder extends along the first pivot direction 710. According to requirements of design, manufacturing, or use, the second mesh 200 may be formed by one part or spliced by a plurality of parts, and may be made of metal, alloy, polymer, or other materials that can provide mechanical strength required to carry the filter material.

In the embodiment shown in FIG. 2A to FIG. 2C, a groove 201 parallel to the first pivot direction 710 is formed on one side of each bar structure 210 with respect to the first mesh 100. The bar structures 210 are connected to each other by long sides thereof. Viewed from different angles, each bar structure 210 has a first frame piece 211, a second frame piece 212, and a third frame piece 213 that are sequentially connected by long sides and jointly form the groove 201, and the groove 201 of each bar structure 210 faces the first mesh 100. The third frame piece 213 of one of the bar structures 210 is connected to the first frame piece 211 of another adjacent bar structure 210, so that the plurality of bar structures 210 surround the first mesh 100 with respect to the first pivot direction 710.

Figure 3A:
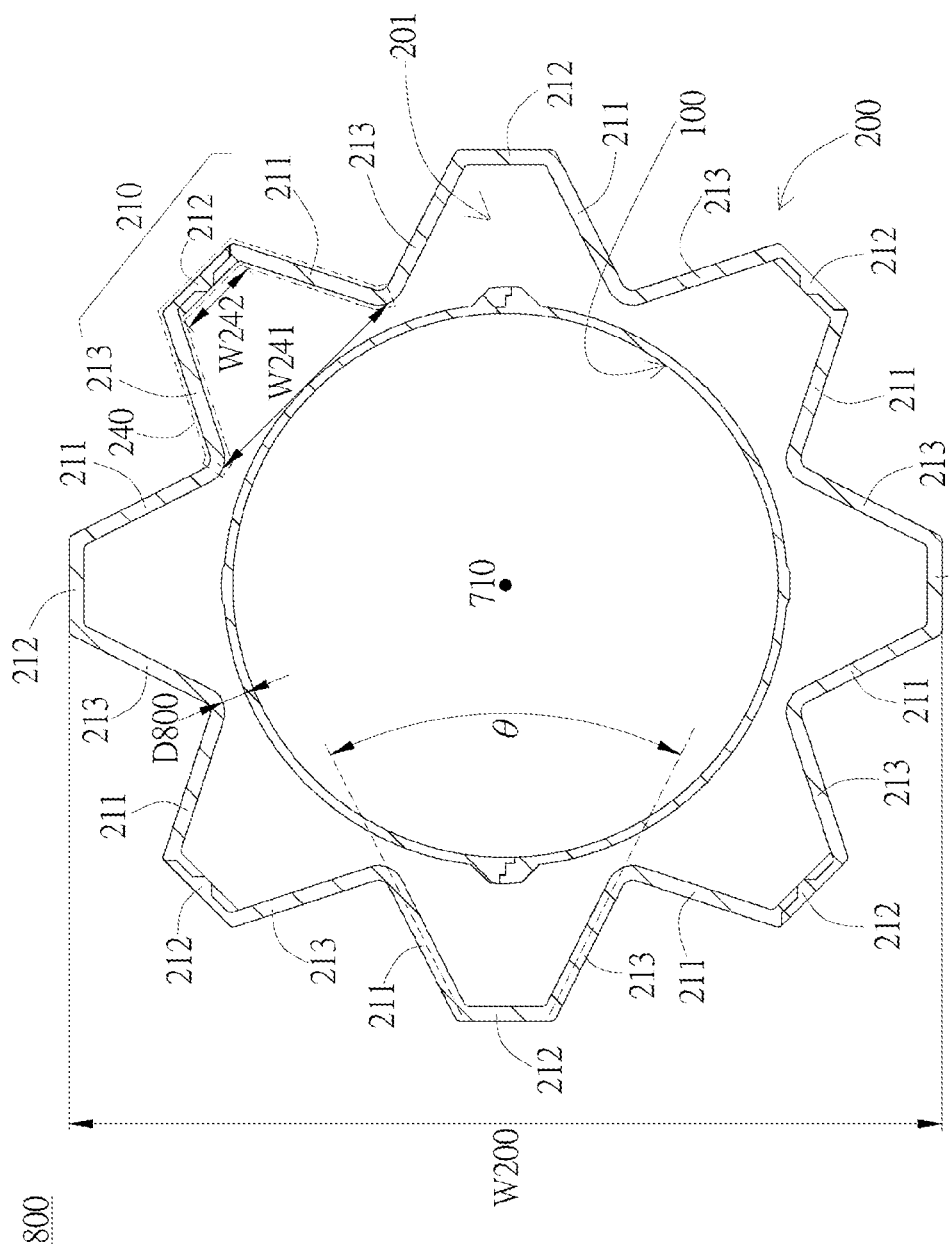
FIG. 3A is a schematic cross-sectional view of an embodiment of a filter mesh frame on a virtual cross section perpendicular to a first pivot direction according to the present invention.

In an embodiment shown in FIG. 3A, the bar structure 210 has a U shaped-like cross section 240 on a virtual cross section perpendicular to the first pivot direction 710, and a width W241 of an opening portion of the U shaped-like cross section 240 facing the first mesh 100 is greater than a width W242 of a bottom portion of the U shaped-like cross section 240. Viewed from different angles, on the virtual cross section perpendicular to the first pivot direction 710, the first frame piece 211, the second frame piece 212, and the third frame piece 213 of each bar structure 210 and a connection line between the first frame piece 211 and the third frame piece 213 form a trapezoid. The plurality of bar structures 210 surrounding the first mesh 100 jointly form a gear profile on the virtual cross section perpendicular to the first pivot direction 710.

There is an angle θ between extension lines of two side edges of the U shaped-like cross section 240. The angle θ is preferably between 45° and 60°, and more preferably, between 50° and 55°. The number of bar structures 210 may be adjusted according to requirements of design, manufacturing, or use. A ratio of a maximum width W200 of the second mesh 200 on the virtual cross section perpendicular to the first pivot direction 710 to a width W242 of the bottom portion of the U shaped-like cross section is between 5 and 15, and more preferably, between 9 and 10.

In the embodiment shown in FIG. 3A, the first mesh 100 and the second mesh 200 are not in direct contact, that is, a shortest distance between the first mesh 100 and the second mesh 200 on the virtual cross section perpendicular to the first pivot direction 710 is D800. Accordingly, the accommodating space between the first mesh 100 and the second mesh 200 may be increased, thereby increasing and a filling amount of the filter material. However, in different embodiments, for reasons such as improving mechanical strength, the first mesh grid 100 and the second mesh grid 200 may be in contact with each other, or even fixedly connected. In other words, in a case that the first mesh 100 and the second mesh 200 are in contact with each other, a space of the groove 201 in the bar structure 210 is the accommodating space between the first mesh 100 and the second mesh 200.

In the embodiment shown in FIG. 2B, a first opening 101 and a second opening 102 are respectively formed on two ends of the first mesh 100 which surrounds to form the cylinder, and the filter mesh frame 800 further includes a fixing device 300 and a closing device 400. The fixing device 300 has a port 301 disposed on an outer side of the first opening 101 and respectively connected to one end 100A of the first mesh 100 and one end 200A of the second mesh 200, for the first opening 101 to communicate with the port 301. The closing device 400 is disposed on an outer side of the second opening and respectively connected to an other end 100B of the first mesh 100 and an other end 200B of the second mesh 200, for the second opening 102 to be closed by the closing device 400. More specifically, in an embodiment, a side of the fixing device 300 and a side of the closing device 400 facing the first mesh 100 are respectively provided with engaging grooves corresponding to shapes of end surfaces of the first mesh 100 and the second mesh 200, and the engaging grooves are used for respectively engaging with the first mesh 100 and the second mesh 200.

Figure 4A:
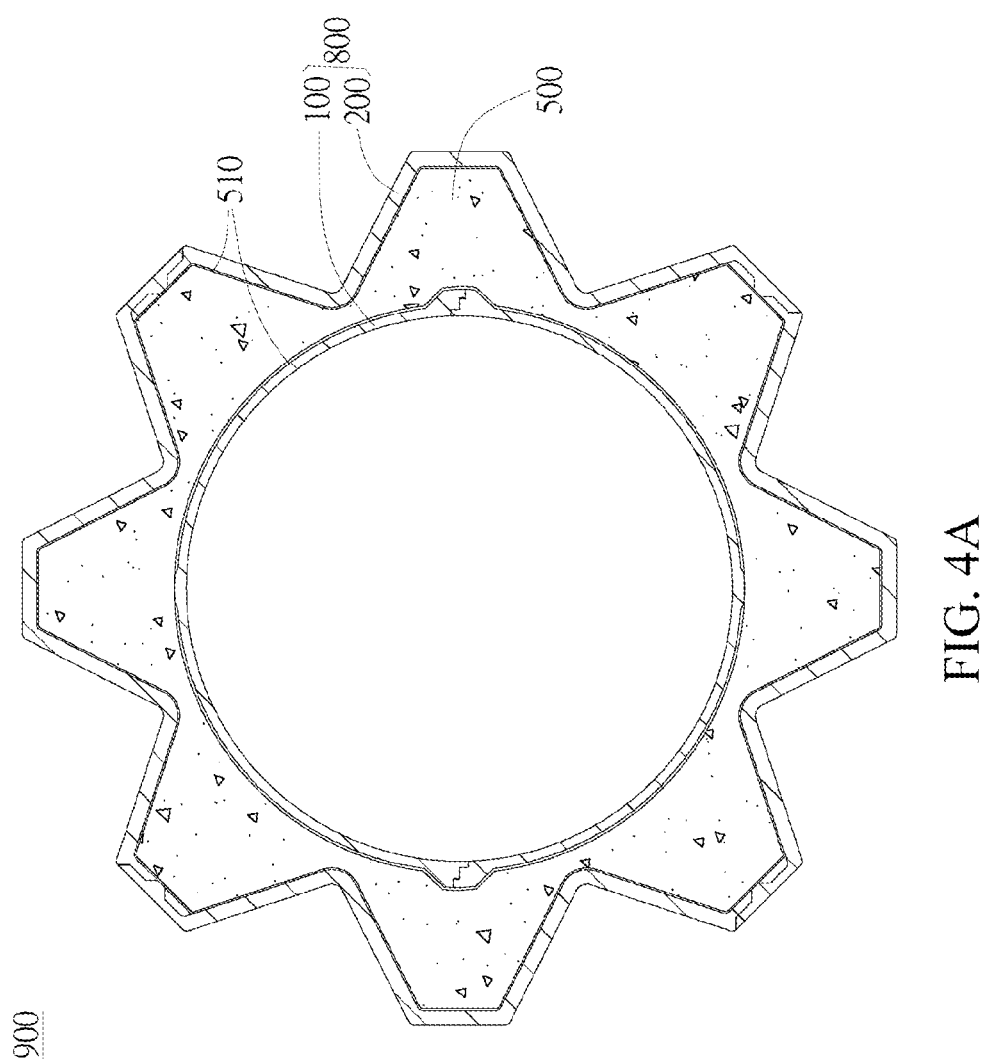
FIG. 4A is a schematic cross-sectional view of an embodiment of a filter mesh structure on a virtual cross section perpendicular to a first pivot direction according to the present invention.
Figure 4B:
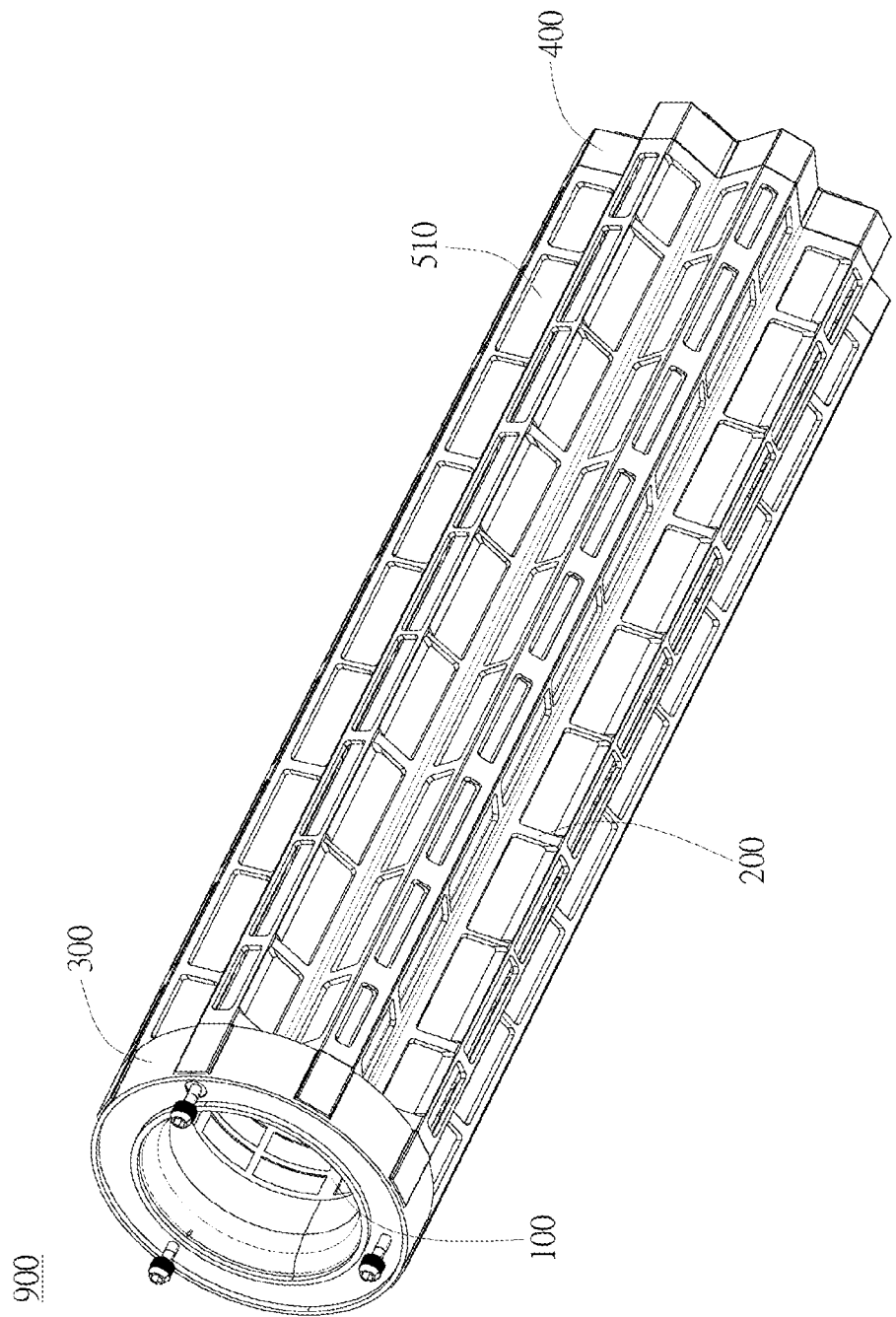
FIG. 4B is a schematic diagram of an embodiment of a filter mesh structure according to the present invention.
Figure 5:
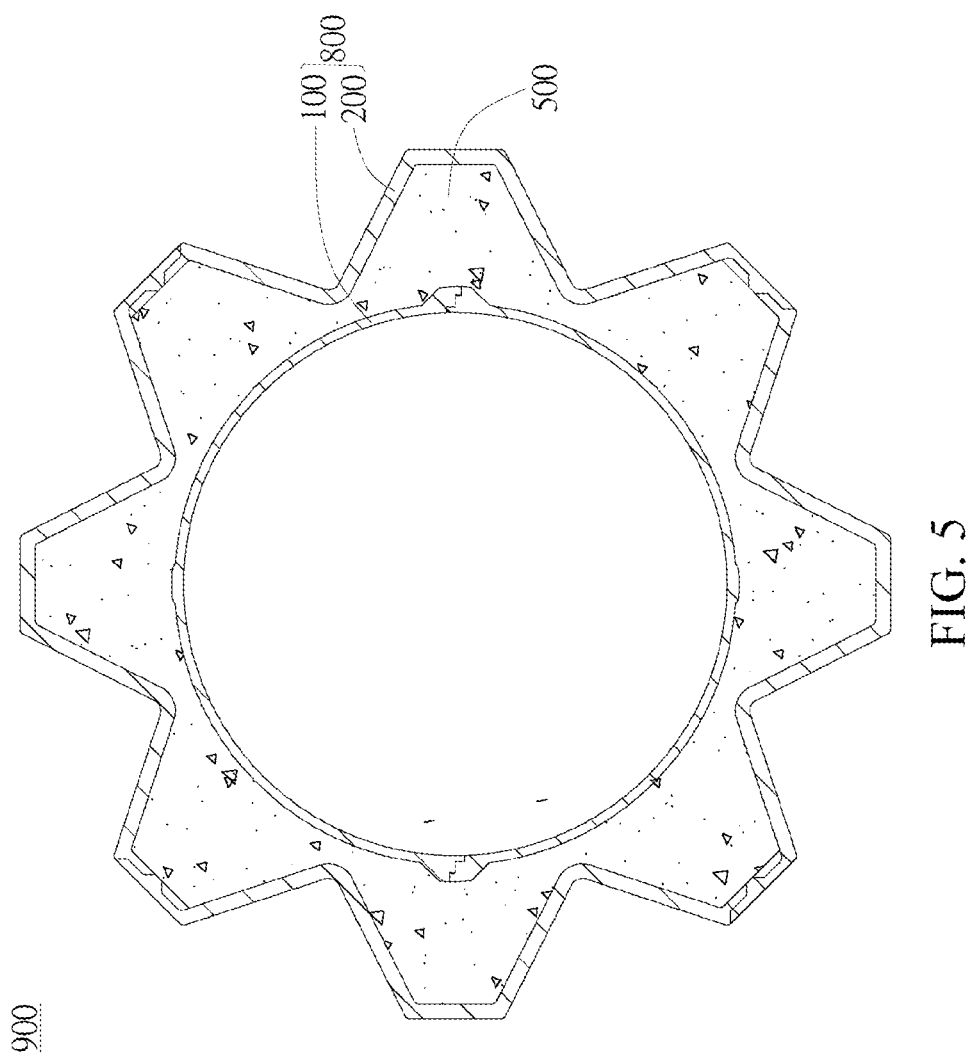
FIG. 5 is a schematic cross-sectional view of different embodiments of a filter mesh structure on a virtual cross section perpendicular to a first pivot direction according to the present invention.

In an embodiment shown in FIG. 4A and FIG. 4B, a filter mesh structure 900 of the present invention includes the filter mesh frame 800 and a filter material 500 disposed between the first mesh 100 and the second mesh 200. To limit the filter material 500 to the accommodating space between the first mesh 100 and the second mesh 200, opposite sides of the first mesh 100 and the second mesh 200 may be further provided with a filter cloth 510 having a pore size smaller than a particle size of the filter material 500. However, as shown in FIG. 5, in different embodiments, the first mesh grid 100 and the second mesh grid 200 may alternatively directly have pores smaller than the particle size of the filter material, so that arrangement of the filter cloth is omitted.

The filter mesh structure of the present invention is tested below. The characteristics of each test group are shown in Table 1 below.

TABLE 1

Figure 3B:
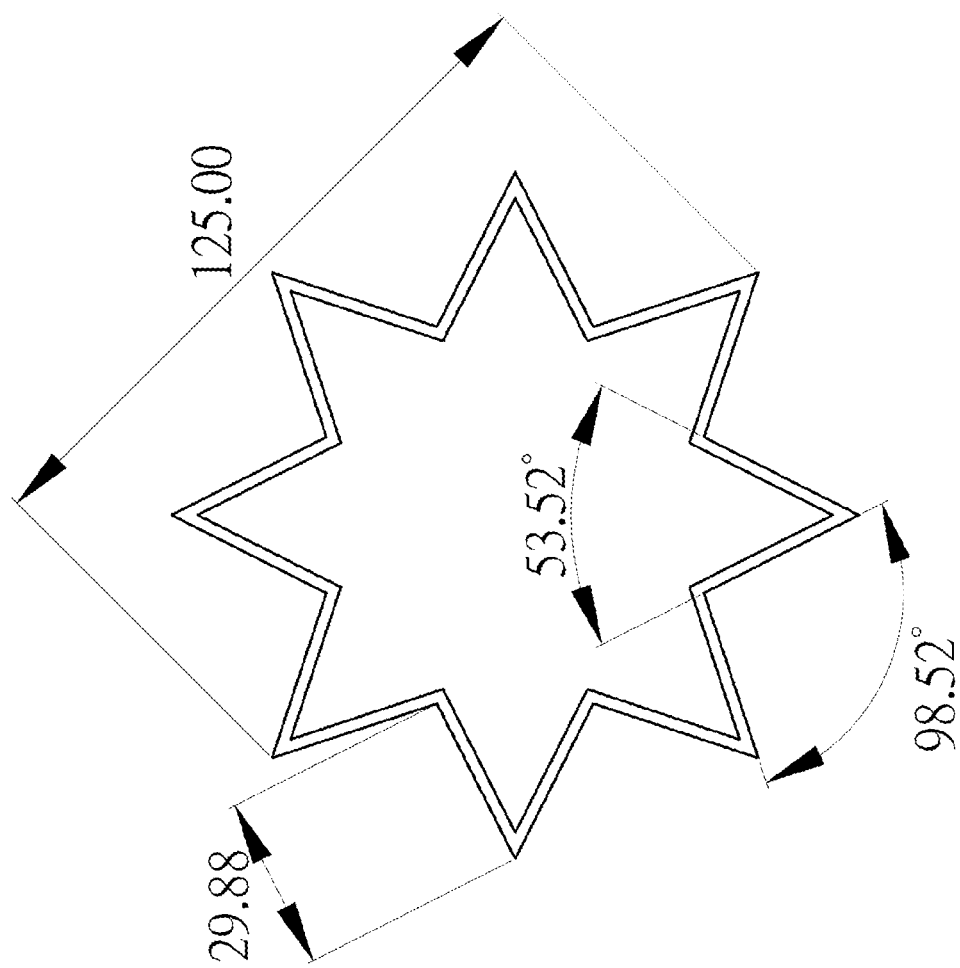
FIG. 3B is a schematic cross-sectional view of another embodiment of the filter mesh frame on the virtual cross section perpendicular to the first pivot direction.

| Group | Characteristic |
| --- | --- |
| Conventionally (where both the inner mesh and the outer mesh have circular cross sections) | Inner mesh: a cylinder with a diameter of 9 cm and a length of 60 cm. Outer mesh: a cylinder with an inner diameter of 15 cm and a length of 60 cm. 8-mesh columnar active carbon is filled between the inner mesh and the outer mesh. |
| Embodiment 1 (where the inner mesh has a circular cross section and the outer mesh has a trapezoidal cross section) | First mesh: a cylinder with a diameter of 9 cm and a length of 60 cm. Second mesh: as shown in FIG. 3A, including the bar structures 210 with the U shaped-like cross section, where the angle θ is 53.52°, the number of bar structures 210 is 8, the width W200 is 148 cm, the width W242 is 15.45 cm, and the length of the second mesh is 60 cm. 8-mesh columnar active carbon is filled between the first mesh and the second mesh. |
| Embodiment 2 (where the inner mesh has a cross section in a shape similar to a star and the outer mesh has a circular cross section) | Inner mesh: as shown in FIG. 3B, having a cross section in a shape similar to a star, where an angle θ at each corner of the cross section is 53.52°, each corner of the cross section is a bar structure, the number of the bar structures is 8, and a maximum width of the inner mesh is 12.5 cm, and a length of the inner mesh is 60 cm. Outer mesh: a cylinder with an inner diameter of 15 cm and a length of 60 cm. 8-mesh columnar active carbon is filled between the inner mesh and the outer mesh. |

Figure 6A:
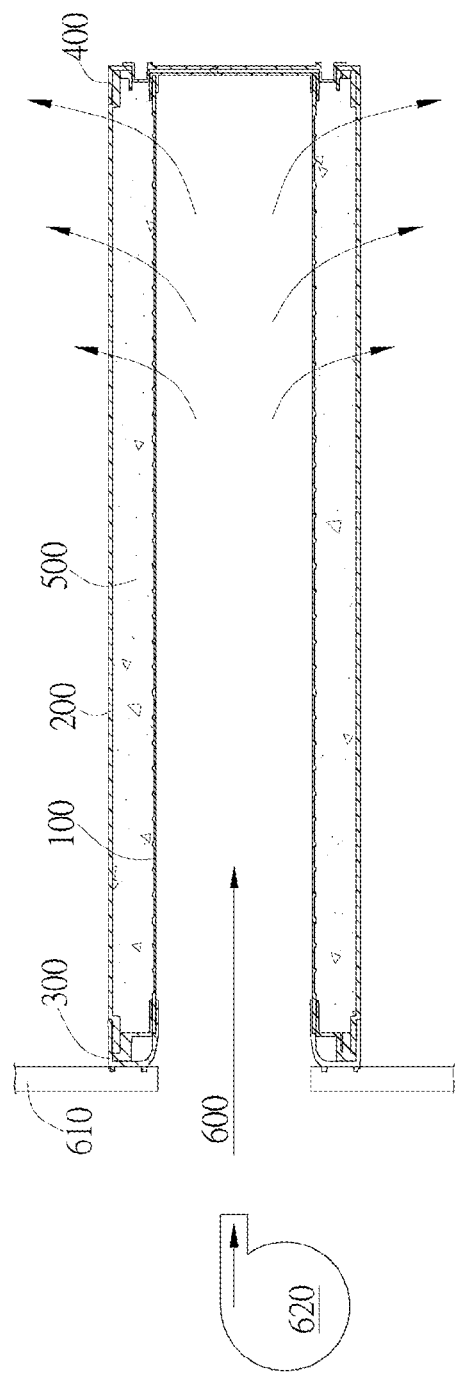
FIG. 6A is a schematic diagram of an embodiment in which filtered air is pushed into a filter mesh structure according to the present invention.
Figure 6B:
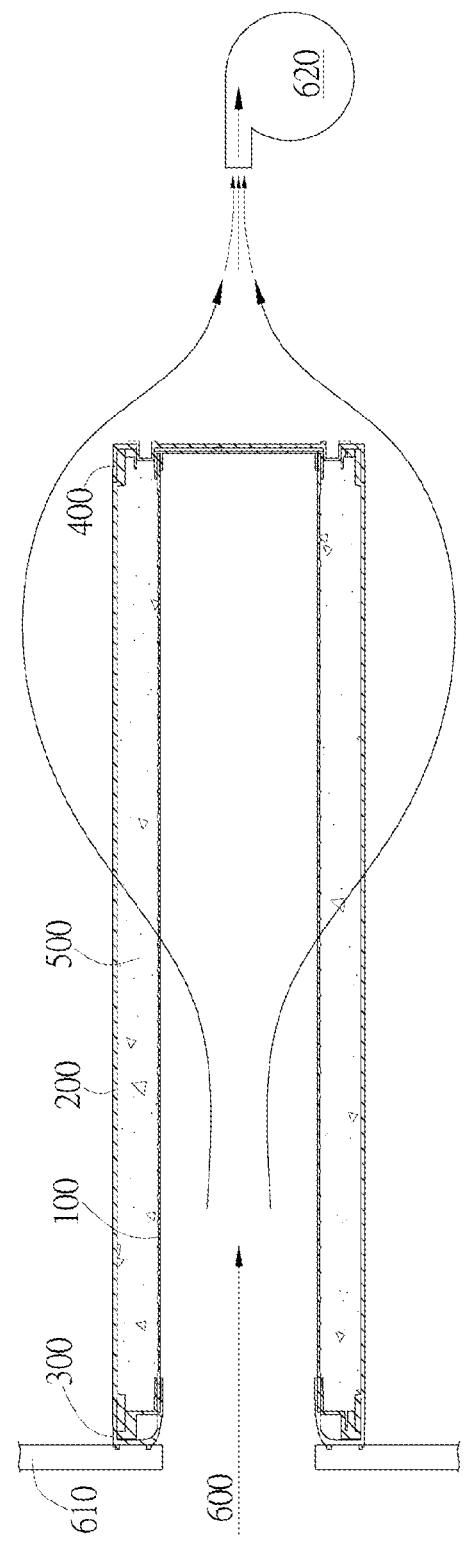
FIG. 6B is a schematic diagram of an embodiment in which filtered air is sucked into a filter mesh structure according to the present invention.

During the test, filtered air enters the filter mesh structure in a pushing manner or a suction manner. More specifically, the pushing manner in an embodiment is shown in FIG. 6A, in which the filter mesh structure is fixed on an air vent of a compartment 610. On an other side of the air vent of the compartment 610 with respect to the filter mesh structure 900, a device such as a fan 620 is used to provide a thrust, to push filtered air 600, through the air vent of the compartment 610, from the first opening 101 into the filter mesh structure 900, the filtered air sequentially passes through the first mesh 100, the filter material 500, and the second mesh 200, and then leaves the filter mesh structure 900. The suction manner in an embodiment is shown in FIG. 6B, in which the filter mesh structure is fixed on the air vent of the compartment 610, and a device such as the fan 620 is used at an outer side of the filter mesh structure 900 to provide a suction force to suck the filtered air 600, through the air vent of the compartment 610, from the first opening 101 into the filter mesh structure 900, the filtered air 600 sequentially passes through the first mesh 100, the filter material 500, and the second mesh 200, and then leaves the filter mesh structure 900. Both the inner mesh of the conventional filter mesh structure and the first mesh of the filter mesh structure of the present invention have an opening at one end and an other end being closed. During the test, for a mounting manner of the conventional filter mesh structure, reference is made to a mounting manner of the filter mesh structure of the present invention.

Pressure Loss Test

Air is pushed into the filter mesh structures at a surface wind speed of 2.5 m/s in the pushing manner, a pressure at an inlet of the filter mesh structure and a pressure at an outer side of another end of the filter mesh structure with respect to the inlet are measured, and subtraction is performed on the pressures to obtain pressure loss. Test results are shown in Table 2 below.

TABLE 2

|  | Pressure loss |
| --- | --- |
| Conventionally (where both the inner mesh and the outer mesh have circular cross sections) | 135 Pa |
| Embodiment 1 (where the inner mesh has a circular cross section and the outer mesh has a trapezoidal cross section) | 76 Pa |
| Embodiment 2 (where the inner mesh has a cross section in a shape similar to a star and the outer mesh has a circular cross section) | 126 Pa |

It can be seen from Table 2 that compared with the conventional filter mesh structure, as shown in Embodiment 1 and Embodiment 2, the filter mesh structure of the present invention can effectively reduce the pressure loss.

Surface Wind Speed at Points

Air is pushed into the filter mesh structures at a surface wind speed of 2.5 m/s in the pushing manner or the suction manner, and surface wind speeds of the second mesh at an outer side of an inlet (that is, an air inlet side) of the filter mesh structure, an outer side of a center (that is, a central side) of the second mesh, and an outer side of an other end (that is, a bottom end side) of the second mesh with respect to the inlet are measured. Test results are shown in Table 3 below.

TABLE 3

|  | Air inlet side | Central side | Bottom end side |
| --- | --- | --- | --- |
| Conventionally, in the pushing manner (where both the inner mesh and the outer mesh have circular cross sections) | 0.1 m/s | 0.3 m/s | 0.5 m/s |
| Conventionally, in the suction manner (where both the inner mesh and the outer mesh have circular cross sections) | 0.1 m/s | 0.3 m/s | 0.5 m/s |
| Embodiment 1, in the pushing manner (where the inner mesh has a circular cross section and the outer mesh has a trapezoidal cross section) | 0.1 m/s | 0.17 m/s | 0.24 m/s |
| Embodiment 1, in the suction manner (where the inner mesh has a circular cross section and the outer mesh has a trapezoidal cross section) | 0.5 m/s | 0.5 m/s | 0.6 m/s |

It can be seen from Table 3 that, compared with the conventional filter mesh structure, as shown in Embodiment 1, the difference in surface wind speed at each point on the outer side of the second mesh of the filter mesh structure of the present invention is relatively small. In other words, a difference in a flow rate of the filtered air passing through the filter materials at different distances from the air inlet is small, so that the filter materials at different distances from the air inlet can be used more uniformly, which improves the overall usage efficiency of the filter material and improves the adsorption effect of the filter material.

In another aspect, it can be seen from Table 3 that the filter mesh structure of the present invention shown in Embodiment 1 has a smaller difference in surface wind speed when the suction manner is used. In other words, the filter mesh structure of the present invention has a better effect when used in the suction manner.

Although the above description and figures have revealed the preferred embodiments of the present invention, it is necessary to understand that various additions, many modifications and substitutions can be used in the preferred embodiments of the present invention without departing from the spirit and scope of the principle of the present invention as defined in the claims attached. One of ordinary skill in the art of the present invention should understand that modifications of various forms, structures, arrangements, ratios, materials, elements, and components can be made on the present invention. Therefore, the embodiments disclosed herein are used for illustrating the present invention rather than limiting the present invention. The scope of the present invention should be defined by the attached claims, covers legal equivalents and is not limited to the foregoing description.

REFERENCE NUMERALS

100: First mesh
100A: End
100B: End
101: First opening
102: Second opening
200: Second mesh
200A: End
200B: End
201: Groove
202: Recess
210: Bar structure
211: First frame piece
212: Second frame piece
213: Third frame piece
240: U shaped-like cross section
300: Fixing device
301: Port
400: Closing device
500: Filter material
510: Filter cloth
600: Filtered air
610: Compartment
620: Fan
710: First pivot direction
800: Filter mesh frame
900: Filter mesh structure
D800: Distance
W200: Width
W241: Width
W242: Width
θ: Angle

What is claimed is:

1. A filter mesh frame, comprising:
   a first mesh, which surrounds to form a cylinder with respect to a first pivot direction; and
   a second mesh, which surrounds the first mesh with respect to a first pivot direction and comprises a plurality of bar structures, wherein the bar structures protrude outward with respect to the first mesh and are disposed parallel to the first pivot direction, a groove parallel to the first pivot direction is formed on one side of each bar structure with respect to the first mesh, the bar structure has a U shaped-like cross section on a virtual cross section perpendicular to the first pivot direction, and a width of an opening portion of the U shaped-like cross section facing the first mesh is greater than a width of a bottom portion of the U shaped-like cross section, wherein the number of the bar structures is 8, wherein a ratio of a maximum width of the second mesh on the virtual cross section perpendicular to the first pivot direction to the width of the bottom portion of the U shaped-like cross section is between 5 and 15.

2. The filter mesh frame according to claim 1, wherein the plurality of bar structures are connected to each other by long sides thereof.

3. The filter mesh frame according to claim 1, wherein an angle between 45° and 60° is comprised between extension lines of two side edges of the U shaped-like cross section.

4. The filter mesh frame according to claim 1, wherein an angle between 50° and 55° is comprised between extension lines of two side edges of the U shaped-like cross section.

5. The filter mesh frame according to claim 1, wherein a ratio of a maximum width of the second mesh on the virtual cross section perpendicular to the first pivot direction to the width of the bottom portion of the U shaped-like cross section is between 9 and 10.

6. The filter mesh frame according to claim 1, wherein a first opening and a second opening are respectively formed on two ends of the first mesh which surrounds to form the cylinder, and the filter mesh frame further comprises:
   a fixing device, having a port disposed on an outer side of the first opening and respectively connected to one end of the first mesh and one end of the second mesh, for the first opening to communicate with the port; and
   a closing device, disposed on an outer side of the second opening and respectively connected to an other end of the first mesh and an other end of the second mesh, for the second opening to be closed by the closing device.

7. A filter mesh structure, comprising
   the filter mesh frame according to claim 1; and
   a filter material, disposed between the first mesh and the second mesh.

8. A method for using the filter mesh structure according to claim 7, wherein a suction force is applied on an outer side of the filter mesh structure to suck filtered air into the filter mesh structure from the first opening, and the filtered air sequentially passes through the first mesh, the filter material, and the second mesh, and then leaves the filter mesh structure.

9. A filter mesh structure, comprising
   the filter mesh frame according to claim 2; and
   a filter material, disposed between the first mesh and the second mesh.

10. A filter mesh structure, comprising
    the filter mesh frame according to claim 3; and
    a filter material, disposed between the first mesh and the second mesh.

11. A filter mesh frame, comprising:
- a first mesh, which surrounds to form a cylinder with respect to a first pivot direction; and
- a second mesh, which surrounds the first mesh with respect to a first pivot direction and comprises a plurality of bar structures disposed parallel to the first pivot direction, wherein each bar structure has a first frame piece, a second frame piece, and a third frame piece that are sequentially connected by long sides and jointly form a groove, the groove of each bar structure faces the first mesh, the bar structure has a U shaped-like cross section on a virtual cross section perpendicular to the first pivot direction, and a width of an opening portion of the U shaped-like cross section facing the first mesh is greater than a width of a bottom portion of the U shaped-like cross section, wherein the number of the bar structures is 8, wherein a ratio of a maximum width of the second mesh on the virtual cross section perpendicular to the first pivot direction to the width of the bottom portion of the U shaped-like cross section is between 5 and 15.

12. The filter mesh frame according to claim 11, the third frame piece of one of the plurality of bar structures is connected to the first frame piece of another one of the plurality of bar structures, so that the plurality of bar structures surround the first mesh with respect to the first pivot direction.

13. The filter mesh frame according to claim 11, wherein an angle between 45° and 60° is comprised between extension lines of two side edges of the U shaped-like cross section.

14. The filter mesh frame according to claim 11, wherein an angle between 50° and 55° is comprised between extension lines of two side edges of the U shaped-like cross section.

15. The filter mesh frame according to claim 11, wherein a first opening and a second opening are respectively formed on two ends of the first mesh which surrounds to form the cylinder, and the filter mesh frame further comprises:
- a fixing device, having a port disposed on an outer side of the first opening and respectively connected to one end of the first mesh and one end of the second mesh, for the first opening to communicate with the port; and
- a closing device, disposed on an outer side of the second opening and respectively connected to an other end of the first mesh and an other end of the second mesh, for the second opening to be closed by the closing device.

16. A filter mesh structure, comprising
the filter mesh frame according to claim 11; and
a filter material, disposed between the first mesh and the second mesh.

17. A filter mesh structure, comprising
the filter mesh frame according to claim 12; and
a filter material, disposed between the first mesh and the second mesh.

* * * * *